United States Patent
Perry et al.

(10) Patent No.: US 9,430,851 B2
(45) Date of Patent: *Aug. 30, 2016

(54) METHOD FOR CONVERTING PATHS DEFINED BY A NONZERO WINDING RULE

(71) Applicant: Mitsubishi Electric Research Laboratories, Inc., Cambridge, MA (US)

(72) Inventors: Ronald N Perry, Cambridge, MA (US); Elena J Jakubiak, Arlington, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 337 days.

This patent is subject to a terminal disclaimer.

(21) Appl. No.: 13/942,799

(22) Filed: Jul. 16, 2013

(65) Prior Publication Data

US 2015/0022530 A1   Jan. 22, 2015

(51) Int. Cl.
*G06T 11/20* (2006.01)
*G09G 5/02* (2006.01)
*G06T 11/00* (2006.01)
*G06T 9/20* (2006.01)

(52) U.S. Cl.
CPC ............... *G06T 9/20* (2013.01); *G06T 11/203* (2013.01)

(58) Field of Classification Search
CPC ............ G06T 2207/20221; G06T 2219/2021; G06T 3/00; G06T 7/0079; G06T 7/0081; G06T 7/0083; G06T 7/0089; G06T 5/001; G06T 15/005; G06T 11/203; G06T 11/40; G06T 11/00; G06T 2200/12; G06T 9/20; G06T 2207/20112

USPC .......................................................... 345/440
See application file for complete search history.

(56) References Cited

U.S. PATENT DOCUMENTS

| | | | |
|---|---|---|---|
| 6,111,587 A * | 8/2000 | Covey et al. ................. | 345/629 |
| 6,173,075 B1 * | 1/2001 | Collins ......................... | 382/203 |
| 6,690,385 B1 | 2/2004 | Mukherjee | |
| 7,321,373 B2 | 1/2008 | Yap | |
| 2010/0189353 A1 * | 7/2010 | Perry et al. .................... | 382/179 |
| 2011/0285736 A1 * | 11/2011 | Kilgard ....................... | 345/584 |

OTHER PUBLICATIONS

Author—K. Doan, Canon Inf. Syst. Res. Australia, North Ryde, NSW, Australia,Title—"Antlaliued Rendering of Self-Intersecting Polygons using Polygon Decompositio", Oct. 6-8, 2004,Publisher—IEEE, Computer Graphics and Applications, 2004. PG 2004. Proceedings. 12th Pacific Conference, pp. 383-39.*

* cited by examiner

*Primary Examiner* — Devona Faulk
*Assistant Examiner* — Nicole Gillespie
(74) *Attorney, Agent, or Firm* — Gene Vinokur; James McAleenan; Hironori Tsukamoto

(57) ABSTRACT

A method converts a two-dimensional input path defined according to a nonzero winding rule to an equivalent output path. Degenerate segments and degenerate contours of the input path are removed. Intersections of the input path are determined. Contours of the input path that include intersections are marked. Unmarked interior contours are removed. Intersections are linked. The marked contours are walked to form new contours. Marked contours and degenerate contours are removed. The new contours and the unmarked contours are collected to form the equivalent output path. The equivalent output path can be rendered using either the nonzero winding rule or an even-odd parity rule.

25 Claims, 9 Drawing Sheets

METHOD FOR CONVERTING PATHS DEFINED BY A NONZERO WINDING RULE

FIELD OF THE INVENTION

This invention relates generally to computer graphics, and more particularly to converting paths defined by a nonzero winding rule to equivalent paths that can be rendered by either the nonzero winding rule or an even-odd parity rule.

BACKGROUND OF THE INVENTION

Paths, Contours, and Glyphs

In the field of computer graphics, two-dimensional paths are often used to represent shapes of graphical objects that require rendering to a physical device. Examples of such objects include glyphs structured vector graphics, illustrations, corporate logos, maps, and the like. Although we focus here on digital type, possibly the most common and important two-dimensional object, the following description applies to all types of two-dimensional objects. A collection of glyphs with a consistent design is called a font. Fonts are ubiquitous in computer applications. Fonts can be rendered on many types of physical devices such as computer monitors, telephones, printers, cameras, personal digital assistants (PDAs), global positioning devices, televisions, and the like.

A glyph is described by a path. Formally, a path includes a set of contours and a fill rule. A contour is a bounded and closed region represented as a sequence of piecewise continuous directed segments. Segments can be linear or curved. Fill rules include a nonzero winding rule and an even-odd parity rule.

The even odd parity rule determines the "insideness" of a point for a shape defined by a path by drawing a ray from that point to infinity in any direction and counting the number of path segments from the shape that the ray crosses. If this number is odd, then the point is inside; if even, the point is outside.

The non-zero winding rule is more complex. For a given path C and a given point P: construct a ray, i.e., a straight line, heading out from P in any direction towards infinity. Find all the intersections of C with this ray. Score up the winding number as follows: for every clockwise intersection, i.e., the path passing through the ray from left to right, as viewed from P, subtract 1; for every counter-clockwise intersection, i.e., path passing from right to left, as viewed from P, add 1. If the total winding number is zero, then P is outside C; otherwise, P is inside C.

Glyphs for computer applications are most frequently designed according to the nonzero winding rule. Glyphs can be filled with, e.g., a solid color, or their paths can be outlined, without filling interior portions, to achieve various visual effects.

Nonzero Winding Rule

There are several problems when rendering paths that are to be filled or outlined according to the nonzero winding rule. First, many rendering systems do not support the nonzero winding rule because of its complexity, whereas almost all rendering systems support the even-odd parity rule. Second, the nonzero winding rule is slower to execute than the even-odd parity rule. This can be a problem when rendering on resource constrained devices.

Third, as shown in FIGS. 6A, 6B, and 6C for partial glyphs, the nonzero winding rule can produce "interior edge haloes" 601-603 for rendering systems that operate in a certain way. The halo artifacts occur because the rendering first fills the shape, and then unconditionally antialiases all the edges, which spoils the filling.

Other interior artifacts are shown in FIGS. 6D and 6E. FIG. 6D shows a path 611 with two (directed) contours that would be outlined correctly in the prior art as the letter Q 612. However, if the path 621 is defined by three contours or natural "strokes" as shown in FIG. 6E, then the interior (non-boundary) edges are not removed during the rendering, and the outline 622 is incorrect.

Other problems exist when using the nonzero winding rule, even for rendering systems that support the rule. Paths can often contain self-intersections, coincident segments, and other degenerate cases that rendering systems improperly handle because the systems incorrectly fills or outlines the path.

Therefore, it is desirable to convert a path defined by the nonzero winding rule to an equivalent path that can be rendered with either the even-odd parity rule or the nonzero winding rule. It would be ideal if the equivalent path was simpler, smaller, faster to render, and did not exhibit any incorrect regions or annoying rendering artifacts due to degenerate cases such as those described above.

Furthermore, it is desirable to enable the correct and accurate determination of a segment of a path as either interior or exterior, even when the path contains self-intersections, coincident segments, and other degenerate cases. The correct and accurate determination for the segment permits path rendering systems, path compression systems, path simplification systems, and the like to function correctly when the path contains degenerate cases.

U.S. Pat. No. 6,111,587 describes a method that converts a polygon defined by a nonzero winding rule to a polygon defined by an even-odd parity rule. That method operates on closed polygons with linear edges, where each polygon includes a set of labeled contours. The method does not correctly handle degenerate cases such as coincident segments, coincident points, and self-intersections in all of their variations. That method cannot render a simplified polygon defined by the nonzero winding rule as output.

U.S. Pat. No. 7,321,373 describes a method for performing set operations on two or more arbitrary paths to produce a simple outline path. Like U.S. Pat. No. 6,111,587, that method does not handle all degenerate cases correctly.

SUMMARY OF THE INVENTION

A method converts a two-dimensional input path defined according to a nonzero winding rule to an equivalent output path. Degenerate segments and degenerate contours of the input path are removed. Intersections of the input path are determined. Contours of the input path that include intersections are marked. Unmarked interior contours are removed. Intersections are linked. The marked contours are walked to form new contours. Marked contours and degenerate contours are removed. The new contours and the unmarked contours are collected to form the equivalent output path. The equivalent output path can be rendered using either the nonzero winding rule or an even-odd parity rule.

Differences with the Prior Art

In general, prior all methods operate on closed polygons with linear edges where each polygon includes a set of known labeled contours. The embodiments operate on a more general representation of shape, i.e., open and closed paths with nonlinear edges and no predetermined labeling of which contours belong to which shapes.

Prior art methods convert paths filled by the nonzero winding rule, to paths filled by the even-odd parity rule. The embodiments convert to paths that can be filled with either the even-odd parity rule or the nonzero winding rule. The output paths in the embodiments often require less geometry than the input paths and therefore are more efficient to render and to store.

Prior art methods do not correctly handle coincident edges and coincident points in all cases, e.g., those methods use different steps to determine "outside edges," and do not properly determine "outside edges" in all cases. There, contours "switch" differently due to how the "outside edges" are determined. Also, prior art methods do not always correctly handle degenerate segments, nor do they perform iterative intersection testing in the manner described in the embodiments on contours until convergence to properly handle arithmetic round off errors on underlying integer grid coordinates.

The prior art methods fail to handle all degenerate cases correctly, and do not convert input nonzero winding rule paths to equivalent output paths that are simpler with less geometry as the paths used by the invention. To facilitate this simplification, the embodiments perform various steps to remove unmarked interior contours, degenerate segments, and degenerate contours.

DETAILED DESCRIPTION OF THE PREFERRED EMBODIMENTS

Some embodiments of the invention provide a method for converting a two-dimensional input path defined according to a nonzero winding rule to an equivalent 2D output path that can be rendered by either the nonzero winding rule or an even-odd parity rule. The embodiments correctly label a segment of a path as interior or exterior. The embodiments can produce renderings without aliasing or outlining artifacts. The embodiments are described using the following definitions.

DEFINITIONS

Figure 1:
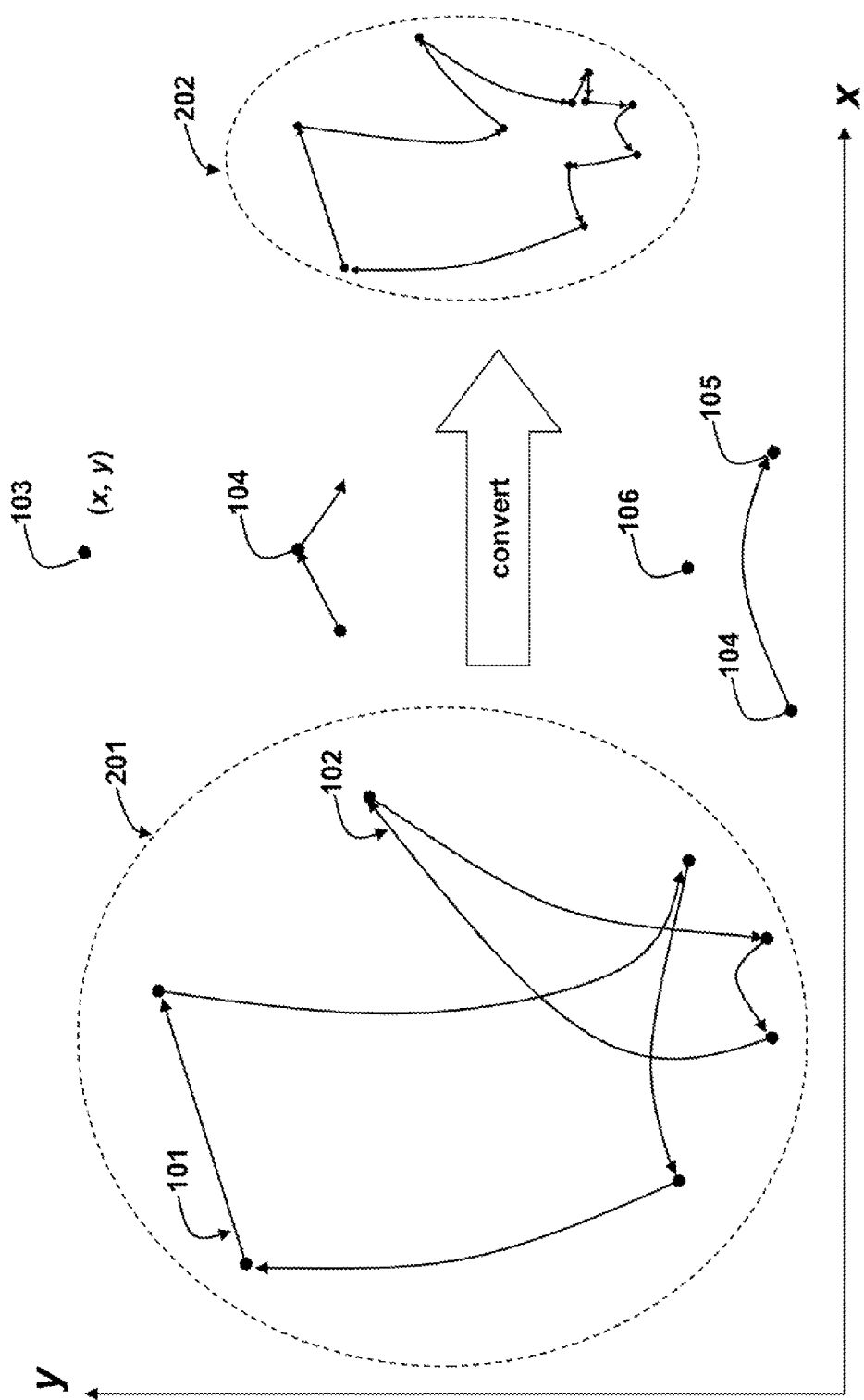
FIG. 1 is a schematic of example contours and paths used by embodiments of the invention including input and output paths.

As shown in FIG. 1, an input path 201 includes a set of contours 101-102. Contours are represented as a sequence of piecewise continuous directed segments. A degenerate contour is an unbounded or open region 104, or a region with a zero area or a contour defined by a single point 103.

A segment is defined using two or more points with (x, y) coordinates defined on an integer grid. The points include a start point 104 and an end point 105. Optionally, there can also be one or more control points 106. For simplicity, this description is limited to linear and Bezier segments defined by two or three points, the extension to any number of points and other curved segments, such as B-splines, will be obvious to those skilled in the art. The segment emanates from the start point and terminates at the end point. The quadratic Bezier segment also includes an off-segment control point. The segment is exterior when it is a portion of a contour that defines a filled region according to the nonzero winding rule. Otherwise, the segment is interior.

Degenerate segments are transformed during processing to produce non-degenerate segments. Some examples follow. A segment start point cannot be coincident to its endpoint. Such segments are discarded. The start point and end point of a quadratic Bezier curve segment B(t), where t ranges from 0 to 1 inclusively, cannot lie on an "interior" portion of the curve segment, i.e., a portion of the curve segment with a parametric time t such that 0<t<1. Such segments are replaced with a line segment. The off-curve control point of a quadratic Bezier curve segment cannot be coincident with either the start point or end point of that quadratic Bezier curve segment. Such segments are replaced with a line segment.

Segments of each contour of the path are partitioned into multiple segments to enforce that every segment is monotonic in both the x and y directions. A segment can be partitioned into two segments by inserting a control point on the segment interior. A quadratic Bezier segment is partitioned by inserting control points according to, e.g., a De Casteljau algorithm. This significantly improves performance when determining self-intersecting contours. It also makes the labeling of a segment as interior or exterior simple and accurate.

Segments are approximated using linear subdivisions. A line segment is trivially approximated using a single linear subdivision. A quadratic Bezier segment is approximated using one or More linear subdivisions. The control points of the linear subdivisions used to represent the quadratic Bezier segment are rounded to integer locations on the grid. A target rendering size is used to limit the number of linear subdivisions required to represent a quadratic. Bezier segment, thereby improving the performance of computing intersections. Linear subdivisions are determined, on an as-needed basis and then saved for future processing. The start and end points of a linear subdivision cannot be coincident; such subdivisions are removed.

A junction contains data associated with a specific intersection. The junction specifies the Cartesian location of the intersection and maintains a list of exterior segments emanating from that intersection, i.e., a list of outbound exterior segments.

Convert Paths Defined by the Nonzero Winding Rule

Figure 2:
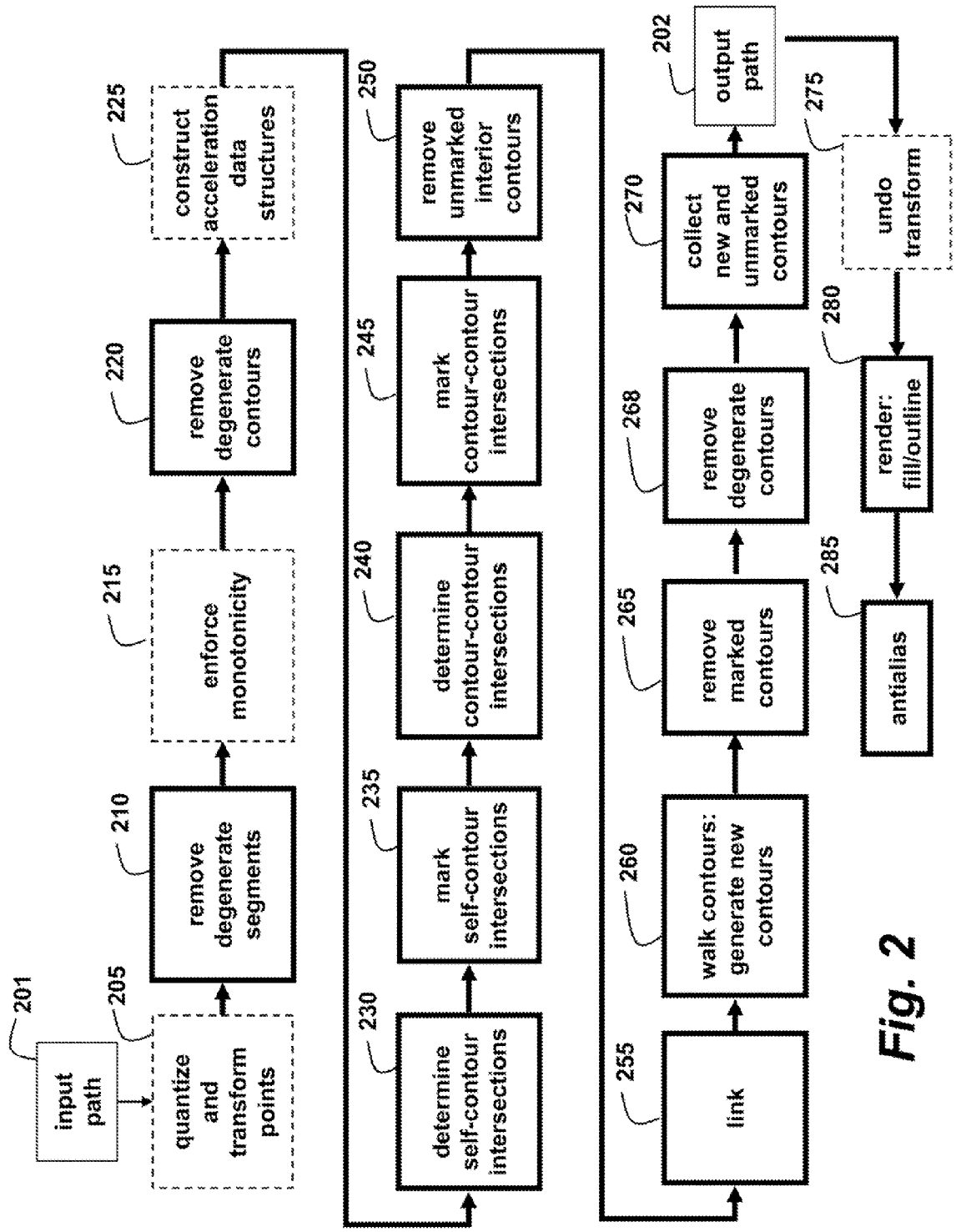
FIG. 2 is a flow diagram of a method for converting a two-dimensional input path defined by a nonzero winding rule to an equivalent 2D output path.
Figure 4:
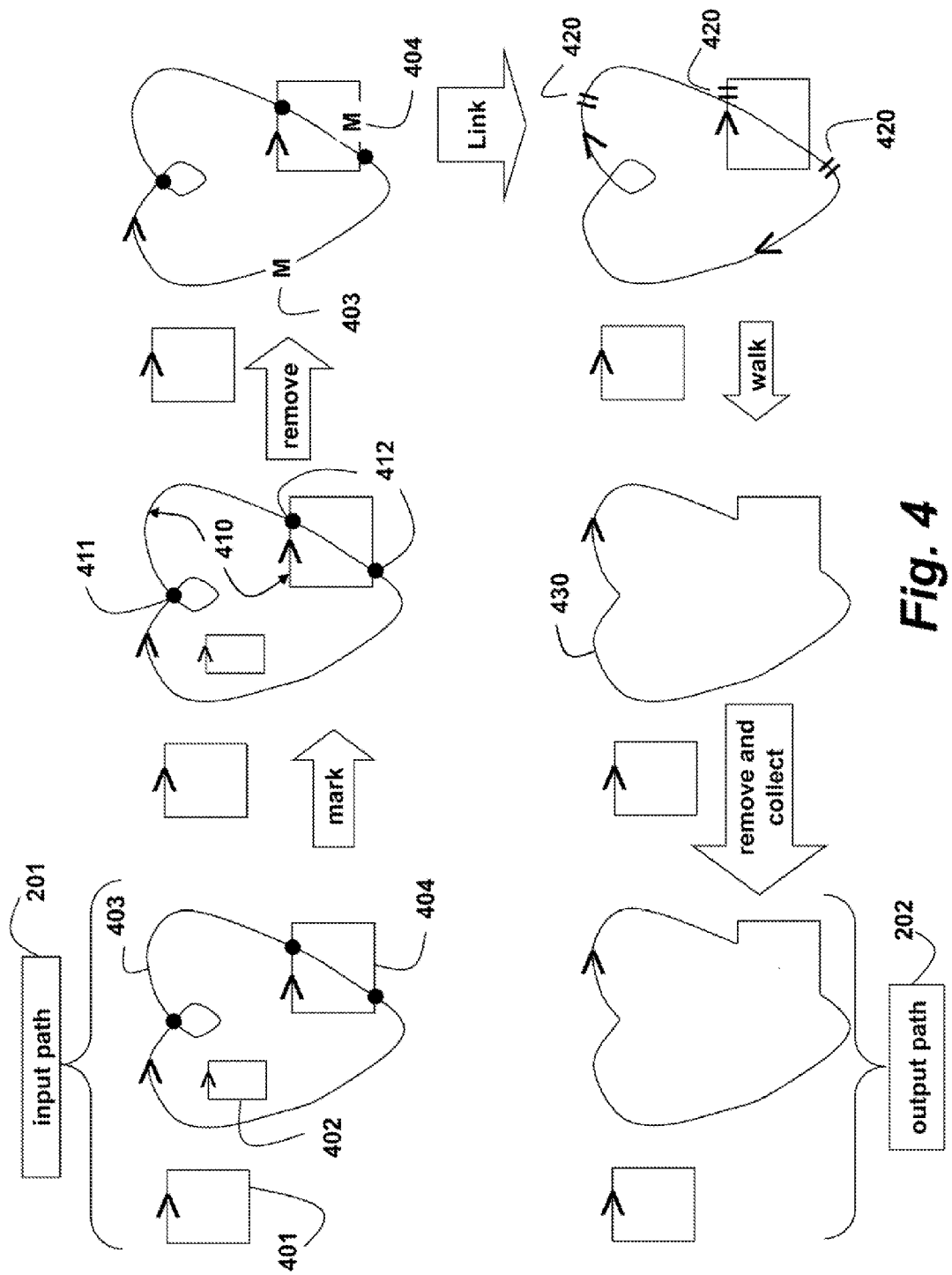
FIG. 4 is a schematic of the method of FIG. 2.

As shown in FIG. 2, some embodiments of the invention provide a method for converting the input path 201 defined by the nonzero winding rule to the equivalent output path 202 that can be rendered by either the nonzero winding rule or the even-odd parity rule. The paths are defined in a two-dimensional (2D) coordinate system. The steps are schematically shown in FIG. 4.

Quantize and Transform

First, the method optionally converts, i.e., quantizes and transforms, 205 non-integer control points of the input path to integers, if necessary. For example. TrueType® fonts are defined on an integer coordinate system of sufficient precision called the EM square and therefore do not require quantization or transformation. When conversion is necessary, control points of the input path specified in floating point or fixed point are transformed, e.g., multiplied by 256, and then rounded to determine integers of sufficient precision.

When this step is skipped, the control points of the input path remain in their original coordinate system. The original coordinate system can be defined on a floating point or a fixed point grid, to name just a few. Arithmetic operations can be performed with a greater precision by skipping the quantizing and transforming, although this may increase processing time and produce flaws in the output path 202.

Replace or Remove Degenerate Segments and Optionally Enforce Monotonicity

Then, after integer conversion, degenerate segments are removed 210. Some examples of degenerate segments follow. A segment start point cannot be coincident to its endpoint. Such segments are discarded. The start point and end point of a quadratic Bezier curve segment B(t), where t ranges from 0 to 1 inclusively, cannot lie on an "interior" portion of the curve segment, i.e., a portion of the curve segment with a parametric time t such that 0<t<1. Such segments are replaced with a line segment. The off-curve control point of a quadratic Bezier curve segment cannot be coincident with either the start point or end point of that quadratic Bezier curve segment. Such segments are replaced with a line segment.

Optionally, monotonicity of the segments in both the x and y directions are enforced 215.

Remove Degenerate Contours

Degenerate contours are removed 220. Some examples of degenerate contours include a contour comprised of a single point, an open contour, i.e., a contour which is not "watertight," and a contour with no interior area.

Construct Data Structures for Accelerating Performance

Data structures for improving the run-time performance of the method are optionally constructed 225. The data structures can also be constructed on demand and only when necessary during steps 230 and 240. Example data structures include bounding boxes, proximity cluster trees, and grids for segments and contours.

Determine Intersections

Self-intersecting contours are determined 230. Self-intersecting contours are partitioned and split at each point P of self-intersection by inserting new control points at P into the sequence of continuous segments preceding and following P. If the optional quantization and transformation step was performed, then intersections are determined at integer coordinates of the grid. Bezier segments are partitioned into linear subdivisions as needed when it is possible the segments could contribute to an intersection. Intersection testing is performed on the linear subdivisions to improve performance and accuracy. The monotonicity of the segments and the acceleration data structures are used to minimize segment-segment intersection tests. Mark 235 each contour of the input path containing a self-intersection. This is followed by determining 240 contour-contour intersections, which are also marked 245. For the purpose of this description, contours that are not explicitly marked in some way are considered "unmarked."

Following are additional rules and conventions when determining intersections. To avoid redundant intersections, intersections that occur at t=0 are not counted, but intersections that occur at t=1 are counted. Two coincident line segments have at most two intersections. A sequence of line segments connected in a contour at a common endpoint does not intersect at that common endpoint. After intersecting contours have been processed, any linear subdivisions generated are no longer used. The intersections are inserted into the contours, e.g., Bezier segments are partitioned and split at their intersections, and the contours of the path are walked as described below.

The contour intersection steps are repeated until no further intersections occur. This repetition is performed because new intersections can occur as a result of previously determined intersections. This step ensures that the output path 202 is correct and that subsequent rendering and processing is without any artifacts. Note that most input paths require only a single iteration.

Remove Unmarked Interior Contours

Unmarked interior contours of the input path 201 are removed 250. Determine the winding number of any segment, e.g., we typically use the first segment of each unmarked contour of the input path 201 to determine whether the segment is an interior contour and needs to be removed prior to the walking step. Contours of the input path 201 initially hidden may be revealed after the walking step and therefore are removed now.

Linking and Generating Junctions

Then, intersections are linked 255 by generating a junction associated with the Cartesian location of each intersection. A junction contains data about a specific intersection and specifies the Cartesian location of the intersection and maintains a list of segments starting at that location. For each unique intersection, i.e., each intersection with unique (x, y) coordinates, a list L of exterior outbound segments is determined. For each inbound segment to the intersection, a pointer to L is maintained. An exterior outbound segment is a segment starting at an intersection, emanating outward from the intersection, and whose winding number indicates it is an exterior edge of the input path 201. The proper labeling of outbound segments as exterior is an important step. After linking 255, the segments of L are properly labeled.

Walking

Figure 7:
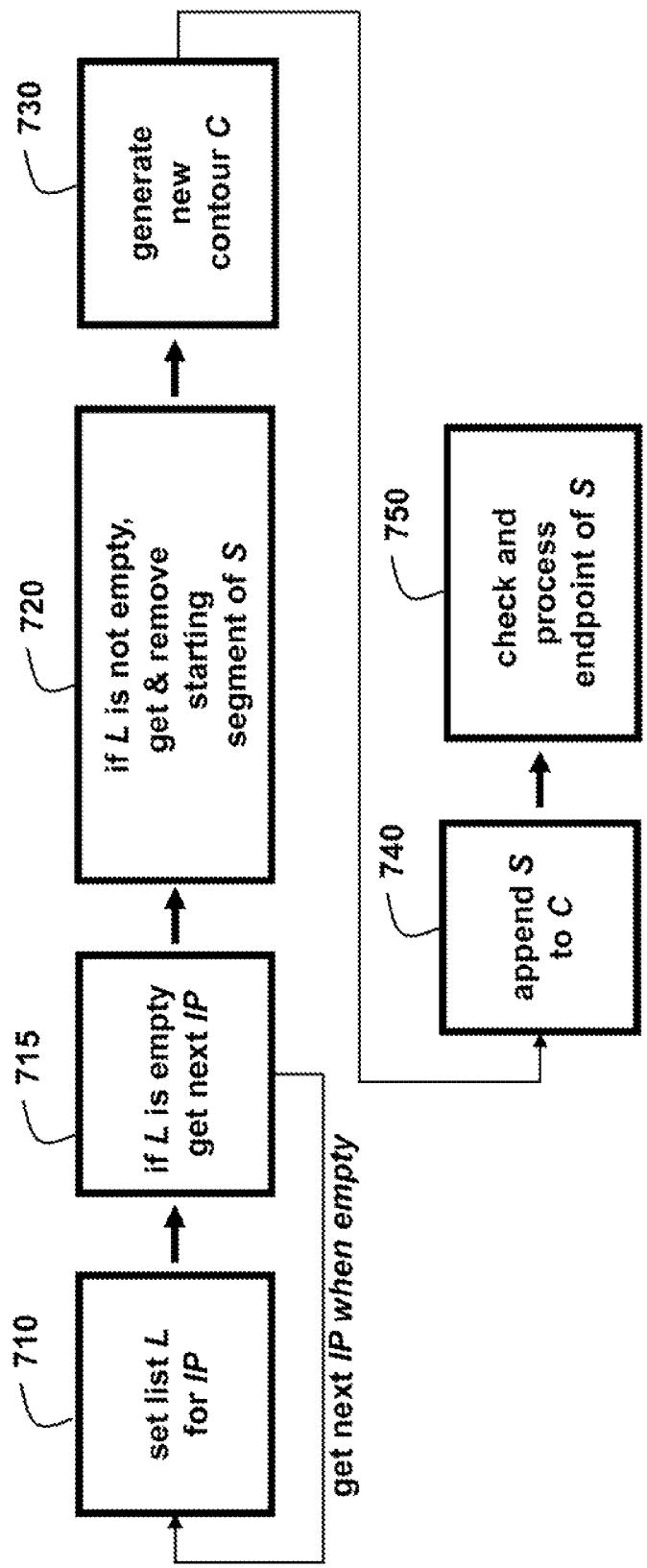
FIG. 7 is a flow diagram of a walking procedure according to embodiments of the invention.

After the intersections are linked 255, each marked contour of the path can be walked 260 to generate new contours by merging. The walking can start at any junction on a marked contour. Segments of marked contours are either copied to the new contours or removed when the segments are interior. The detailed steps of the walking process, as shown in FIG. 7, are as follows:

1. For each intersection point IP, i.e., for each junction, of the marked contours perform these steps:
2. Set 710 L to the list of exterior outbound segments of IP.
3. If 715 L is empty, then goto step 1 and proceed to the next intersection point.
4. If 720 L is not empty, then get and remove the starting segment of L. Set S to this segment.
5. Generate 730 a new contour C.
6. Append 740 segment S to the end of C.
7. If 750 the end point of S is IP, then we have traversed back to IP. Goto step 3.
8. If 750 the end point of S is not another intersection point, then get the next segment, set this segment to S, and proceed to step 6.
9. If 750 the end point of S is another intersection point Q other than IP, then switch contours as follows: get the junction J of Q, get and remove an exterior outbound segment of J, set this exterior outbound segment to S, and proceed to step 6.

Remove Marked Contours

Next, marked contours of the input path 201 are removed 265. Segments of marked contours that contribute to the output path 202 have been copied into the new contours in the previous walking step.

Degenerate Contours are Removed

Next, degenerate contours of the remaining contours are removed 268. Examples of degenerate contours include a contour with a single point, an open contour, and a contour with no interior area.

Forming the Output Path

Finally, the new contours and unmarked contours are collected 270 as the output path 202. The simplified output path can be rendered by either the nonzero winding rule or the even-odd parity rule.

Invert Quantization and Transformation

If the input path 201 was optionally quantized and transformed in step 205, then that process is inverted 275 on the output path 202 to restore the coordinates to their original coordinate system.

Effects of the Conversion

Figure 5:
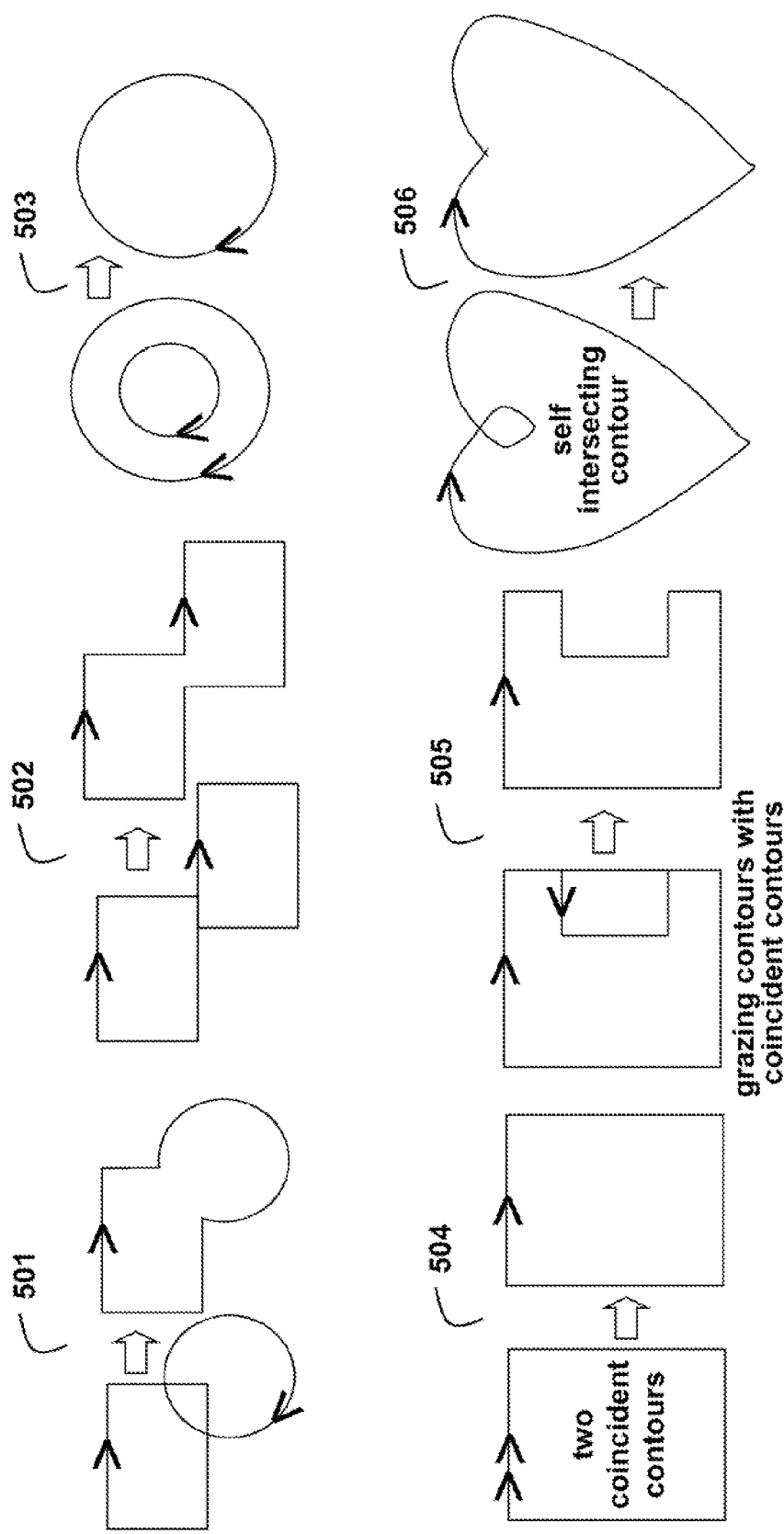
FIG. 5 is a schematic of pairs of input and output paths according to embodiments of the invention.
Figures 6A, 6B, 6C:
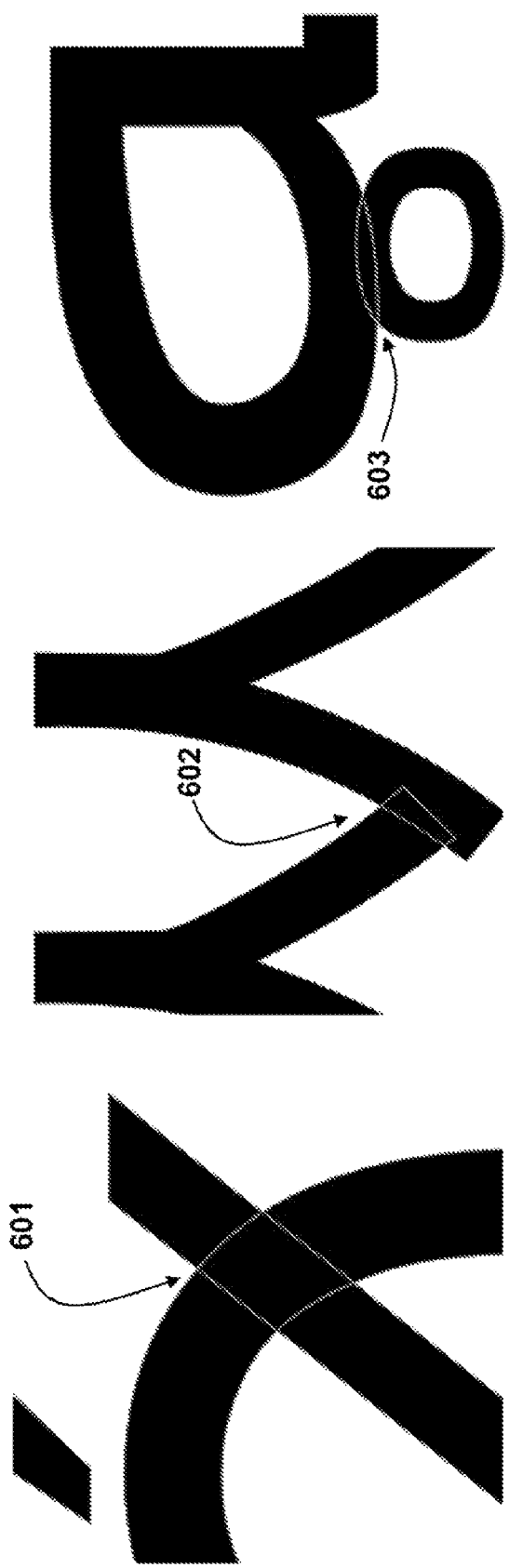
FIGS. 6A, 6B, 6C, 6D and 6E are schematics of prior renderings of glyphs.
Figures 6D, 6E:
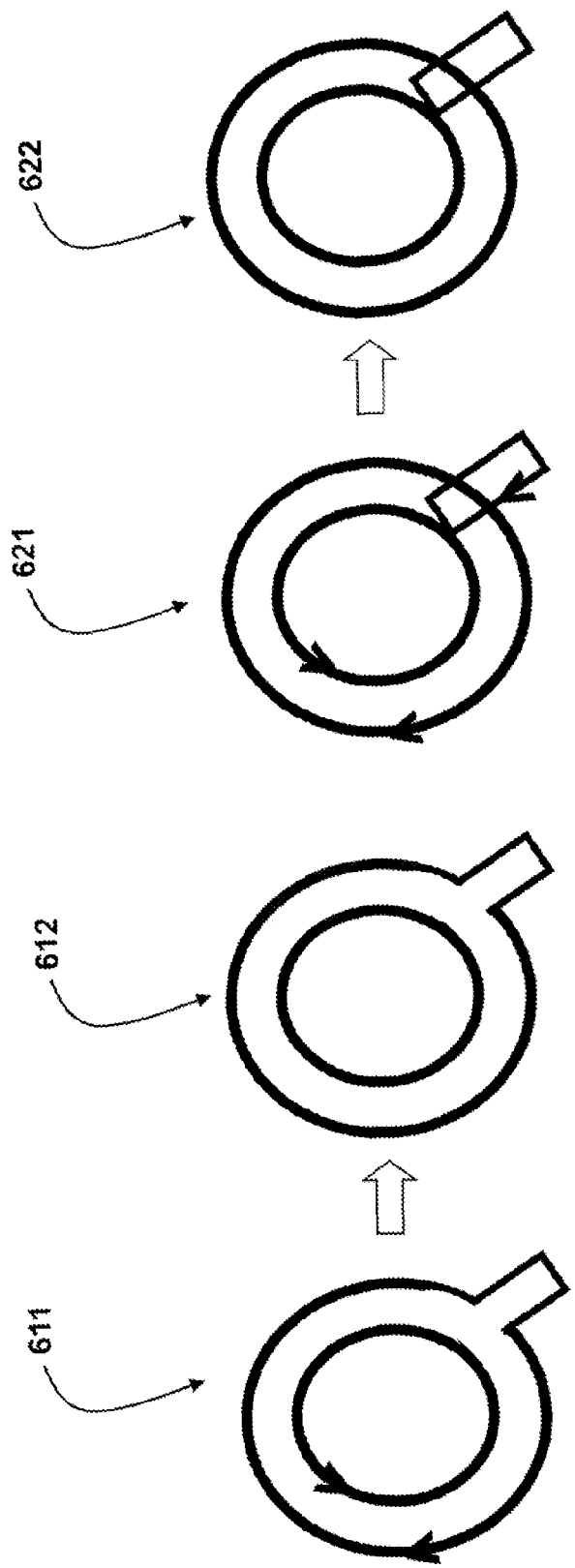

FIG. 5 shows example pairs of paths 501-506, with the input paths 201 on the left, and the output paths 202 on the right. The examples show that the output paths 202 will be correctly rendered with either the nonzero winding rule or the even odd parity rule. Note the presence of degenerate cases, such as coincident segments in the input paths 201, and their proper handling to produce the correct output paths 202.

The merge contours procedure is object-based. The procedure explicitly determines the 2D output path 202 for further processing. Prior art image-based approaches perform this operation during rasterization so that only the pixels exhibit the result, and an explicit 2D output dimensional path is not formed as described herein.

The input to the merge contours procedure is a single directed 2D path, such as a path representing a glyph. The interior of the path is defined by the nonzero winding rule. The output is an equivalent and simplified 2D path that can be rendered by either the nonzero winding rule or the even-odd parity rule. The simplification can include removal of overlapping, self-intersecting, degenerate, and unnecessary contours.

Path Conversion: An Example

FIG. 4 shows the operation of the method for converting an input path 201 schematically. The input path 201 includes an exterior contour 401, an interior contour 402, and two intersecting contours 403-404. The contour 403 is also self-intersecting 411. The contours 403-404 have two contour-contour intersections 412. The contours 403-404 with intersections are marked (M). The unmarked interior contour 402 is removed. Next, junctions are associated with the intersections. Outbound segments 420 at each junction are interior or exterior. The exterior outbound segments at each junction are labeled and indicated by "||".

During the walking, a new contour 430 is generated by merging contours while marked and degenerate contours are removed.

The steps of the above method, as well as any other procedures or methods described herein, can be performed in a processor connected to a memory and input/output interfaces and devices as known in the art.

Rendering: Filling or Outlining Paths Without Artifacts

The output path 202 as generated above can be rendered 280 by filling or outlining with either the nonzero winding rule or the even-odd parity rule. Antialiasing 285 can also be applied. In contrast with the prior art, the filled path does not include an interior aliasing artifacts. Similarly, the outlined path does not include any interior edge artifacts.

Interior and Exterior Segment Labeling

Figure 3:
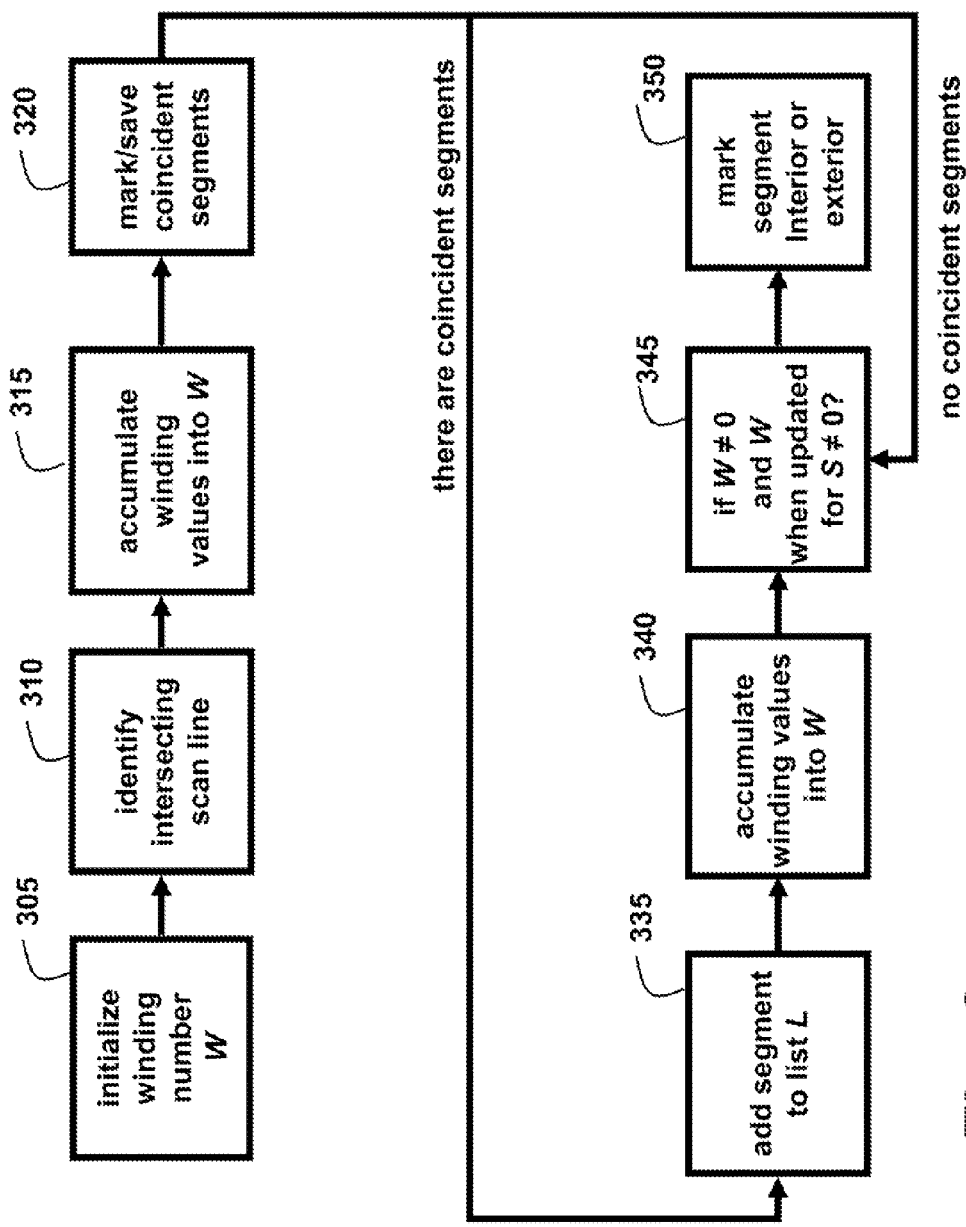
FIG. 3 is a flow diagram of a procedure for labeling segments according to embodiments of the invention.

FIG. 3 shows a procedure to determine whether a segment S is interior or exterior. First, a winding number W is initialized 305 to zero. Next, a scan line that is guaranteed to intersect the segment is identified. 310, if monotonicity is enforced for segments in both x and y directions, then the scan line can be quickly and accurately identified to be either a horizontal or vertical scan line passing through the midpoint of the segment.

For each contour C, the winding values are accumulated 315 into W for any segments of the contour C that cross the identified scan line before crossing the segment S. The accumulation of winding values into W for coincident segments of the contour C that cross the scan line at the same location as segment S is postponed until after all contours have been processed. The coincident segments have to be treated as a group, as far as the winding number is concerned, because they overlap and cancel each other. The coincident segments are marked and saved 320 in a list L; also see FIG. 8 for coincident segments.

When there are no coincident segments, we proceed as follows. If 345 W is nonzero and W, when updated to account for S, is nonzero, then the segment S is marked 350 interior, otherwise the segment S is marked exterior.

When there are coincident segments, we proceed as follows. Add 335 segment S to the list L of saved coincident segments. Pairs of coincident segments in the list L that have opposite directions cancel each other out, and the accumulation of their winding numbers is zero and does not change W. The winding values are accumulated 340 into W for the remaining non-cancelled segments in the list L, excluding segment S. If 345 W is nonzero and W, when updated to account for S, is nonzero, then the segment S is marked 350 interior, otherwise the segment S is marked exterior.

It is noted that prior art methods do not process coincident segments as described above, and therefore can produce incorrect output paths with interior artifacts.

Figure 8:
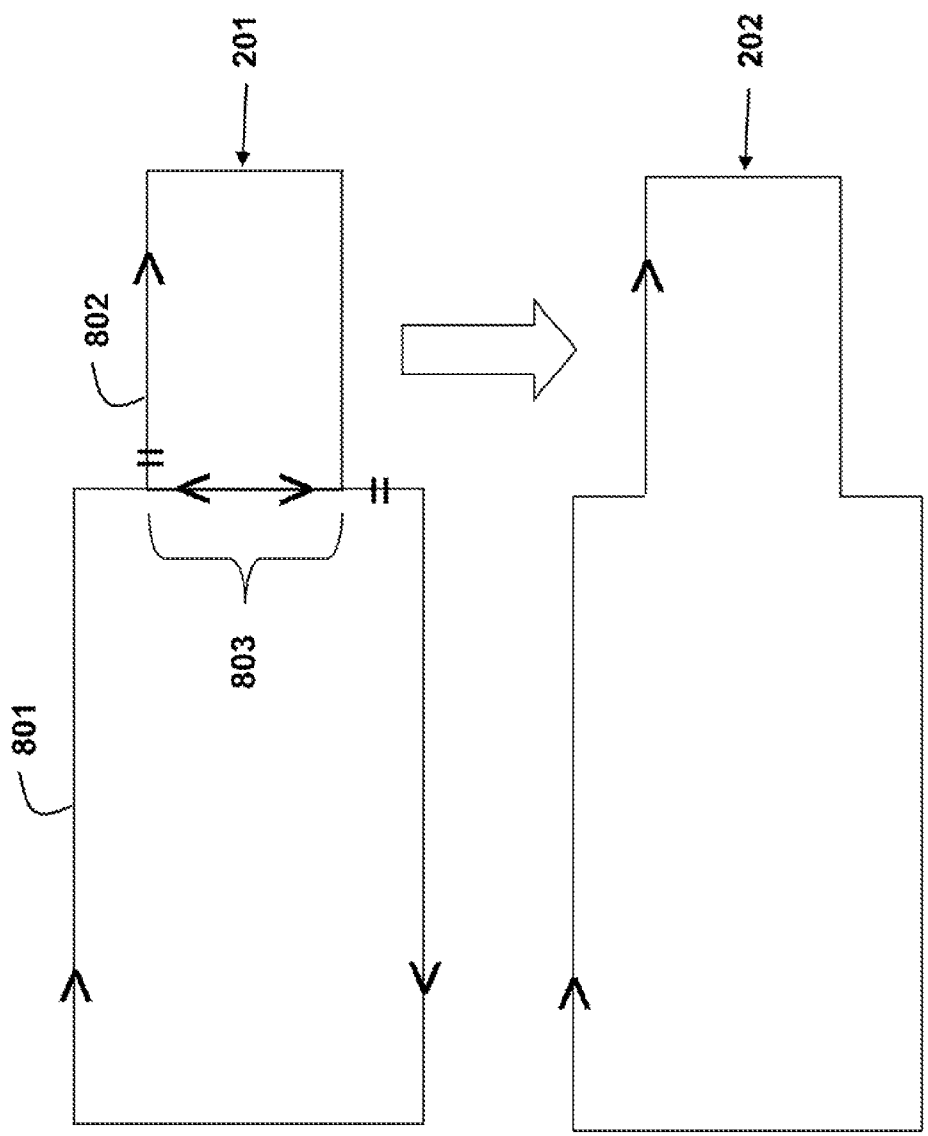
FIG. 8 is a schematic of a procedure for labeling coincident edges according to embodiments of the invention.

FIG. 8 schematically shows the labeling of outbound segments of contours 801-802 of the input path 201 so that the output path 202 is correct. The contours have coincident segments 803. The exterior outbound segments are indicated by "||". Because of the nature of the steps outlined above, the segments 803 are correctly identified as interior, and hence these segments are removed during the walk. To the best of our knowledge no prior art rendering deals with this case correctly in all of its variations. In this case, the coincident segments need to be treated as a group when the winding number is determined.

Applications and Distinguishing Features

Rendering methods that fill paths according to the even-odd parity rule can use the merge contours procedure as outlined in FIG. 2 as a preprocessing step to correctly render paths that are designed to be filled according to the nonzero winding rule, e.g., glyphs in TrueType® fonts.

The merge contours procedure can also be used to eliminate interior edge haloes and outlining artifacts present in various font rendering systems. The even-odd parity rule is less complex and faster to perform than the nonzero winding rule. Consequently, the merge contours procedure can be used to convert the input path to an equivalent output path and then rendered using the even-odd parity rule.

The merge contours procedure can also be used to perform two-dimensional constructive solid geometry (CSG) operations, such as union, intersection, and difference, on two-dimensional paths.

The merge contours procedure solves a very difficult computational geometry problem in real-time and has several distinguishing features when compared to the prior art. The merge contours procedure can handle difficult grazing conditions and singularities, e.g., coincident points and segments. The procedure supports nonlinear curved edges, as well as directed edges. Most prior art procedures only work on polygons with linear edges. The merge contours procedure can use integer arithmetic and operate on an integer grid. It is one to two orders of magnitude faster than comparable prior art procedures.

The merge contours procedure also provides concurrent classification of coincident edges to properly handle grazing conditions, degenerate preprocessing and post processing of segments and contours, and on-demand tessellation of curved segments for determining intersections. The tessellation of curved segments can be based on a target rendering size, thereby optimizing performance for the given target. Monotonicity of segments can be enforced for better performance and accuracy. During the merging, all control points can be represented on an integer coordinate system to improve accuracy and performance. When contour segments are partitioned and split at intersections, the procedure can use iterative intersection testing until convergence to ensure robustness.

The correct labeling of segments as either interior or exterior permits path rendering systems, path compression systems, path simplification systems, and the like to function correctly when the path contains degenerate cases.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit, and scope of the invention.

We claim:

1. A method for converting an object-based input path wherein the object-based input path is defined according to a nonzero winding rule in a two-dimensional (2D) coordinate system the object-based input path includes a set of contours, and each contour includes a sequence of segments, the method comprising the steps of:
    removing degenerate segments of the object-based input path;
    removing degenerate contours of the object-based input path;
    determining intersections of the object-based input path;
    marking the contours of the object-based input path that include intersections;
    removing unmarked interior contours;
    linking the intersections;
    walking the marked contours to form new contours;
    removing marked contours;
    removing degenerate contours; and
    collecting the new contours and the unmarked contours into an output path equivalent to the object-based input path, wherein the output path when rendered to a pixel grid represents sub-pixel geometry, such that the object-based input path when rendered labels the segment within a single pixel, wherein the steps are performed in a processor.

2. The method of claim 1, wherein the object-based input path represents a glyph.

3. The method of claim 1, wherein the object-based input path represents an illustration.

4. The method of claim 1, wherein the object-based input path represents a structured vector graphic.

5. The method of claim 1, further comprising:
    rendering the output path by either the nonzero winding rule or an even-odd parity rule without generating any aliasing or interior edge artifacts.

6. The method of claim 5, wherein the rendering fills the contours.

7. The method of claim 5, wherein the rendering outlines the contours.

8. The method of claim 1, further comprising:
    approximating curved segments with linear subdivisions to determine intersections.

9. The method of claim 1, further comprising:
    enforcing monotonicity on the segments.

10. The method of claim 1, further comprising:
    associating a junction with each intersection, wherein the junction specifies a Cartesian location of the intersection and maintains a list of exterior segments emanating from the intersection.

11. The method of claim 1, wherein the degenerate segments include any segment with a start point coincident with an end point of the segment, any segment that is a curve with the start point and the end point on an interior portion of the curve, and any segment with an off-curve control point of the curve that is coincident with either the start point or the end point of that curve, and wherein the degenerate contours include any contour that is an unbounded or an open region, or a region with a zero area, or any contour defined by a single point.

12. The method of claim 1, wherein some of the segments are coincident.

13. The method of claim 1, wherein some of the contours are self-intersecting.

14. The method of claim 1, wherein coordinates defining the segments are specified with integers.

15. The method of claim 1, wherein coordinates defining the segments are specified with floating point numbers.

16. The method of claim 1, wherein coordinates defining the segments are specified with fixed point numbers.

17. The method of claim 1, wherein the determining of the intersections of the object-based input path is performed on an integer grid.

18. The method of claim 1, wherein the determining of the intersections of the object-based input path is performed on a floating point grid.

19. The method of claim 1, wherein the determining of the intersections of the object-based input path is performed on a fixed point grid.

20. The method of claim 1, wherein the determining of the intersections of the object-based input path is repeated until no further intersections are found.

21. The method of claim 1, wherein the determining of the intersections of the object-based input path uses on demand tessellation of curved segments at a target rendering size to improve performance.

22. The method of claim 1, wherein the determining of the intersections of the object-based input path uses acceleration data structures to improve performance.

23. The method of claim 22, wherein the acceleration data structures includes bounding boxes, trees, or grids.

24. The method of claim 1, wherein the segments of the object-based input path are quantized and transformed to an integer grid.

25. The method of claim 24, wherein the segments of the output path are transformed back to an original coordinate system before the collecting.

* * * * *